(12) United States Patent
Hiester

(10) Patent No.: US 10,260,524 B2
(45) Date of Patent: Apr. 16, 2019

(54) GAS TURBINE ENGINE WITH COMPRESSOR DISK DEFLECTORS

(71) Applicant: UNITED TECHNOLOGIES CORPORATION, Hartford, CT (US)

(72) Inventor: Paul J. Hiester, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 272 days.

(21) Appl. No.: 14/917,981

(22) PCT Filed: Sep. 10, 2014

(86) PCT No.: PCT/US2014/054915
§ 371 (c)(1),
(2) Date: Mar. 10, 2016

(87) PCT Pub. No.: WO2015/050680
PCT Pub. Date: Apr. 9, 2015

(65) Prior Publication Data
US 2016/0215792 A1    Jul. 28, 2016

Related U.S. Application Data

(60) Provisional application No. 61/885,547, filed on Oct. 2, 2013.

(51) Int. Cl.
*F01D 25/12* (2006.01)
*F01D 5/08* (2006.01)
(Continued)

(52) U.S. Cl.
CPC .......... *F04D 29/582* (2013.01); *F01D 5/082* (2013.01); *F01D 5/085* (2013.01); *F01D 5/087* (2013.01);
(Continued)

(58) Field of Classification Search
CPC .......... F01D 5/082; F01D 5/085; F01D 5/087; F01D 5/088; F04D 25/045; F04D 29/582;
(Continued)

(56) References Cited

U.S. PATENT DOCUMENTS 2,973,938 A * 3/1961 Alford .................... F01D 5/085
416/96 R
3,647,313 A * 3/1972 Koff ........................ F01D 5/084
415/115

(Continued)

FOREIGN PATENT DOCUMENTS

GB    2266927 A    11/1993

OTHER PUBLICATIONS

Supplementary European Search Report for European Application No. 14850225.5 dated May 30, 2017.
(Continued)

*Primary Examiner* — Igor Kershteyn
*Assistant Examiner* — Christopher R Legendre
(74) *Attorney, Agent, or Firm* — Carlson, Gaskey & Olds, P.C.

(57) ABSTRACT

A compressor section for use in a gas turbine engine is comprised of a plurality of compressor stages, with each stage including a disk having an inner periphery defining a bore that faces a shaft. A flow path flows in a generally axial direction between the shaft and the bores of each disk. At least one deflector is positioned between a pair of adjacent bores to direct the air flow radially outwardly into a cavity formed between an associated pair of adjacent disks.

19 Claims, 3 Drawing Sheets

(51) Int. Cl.
*F02C 7/18* (2006.01)
*F04D 25/04* (2006.01)
*F04D 29/32* (2006.01)
*F04D 29/58* (2006.01)

(52) U.S. Cl.
CPC ............. *F01D 5/088* (2013.01); *F01D 25/12* (2013.01); *F02C 7/18* (2013.01); *F04D 25/045* (2013.01); *F04D 29/321* (2013.01); *F04D 29/584* (2013.01); *Y02T 50/676* (2013.01)

(58) Field of Classification Search
CPC ... F04D 29/584; F04D 29/321; F05B 2240/20
See application file for complete search history.

(56) References Cited

U.S. PATENT DOCUMENTS

| | | | |
|---|---|---|---|
| 4,645,416 A | 2/1987 | Weiner | |
| 5,054,996 A | 10/1991 | Carreno | |
| 5,108,261 A | 4/1992 | Ress, Jr. et al. | |
| 5,127,794 A | 7/1992 | Burge et al. | |
| 5,154,575 A | 10/1992 | Bonner | |
| 5,271,711 A * | 12/1993 | McGreehan | F01D 5/085 415/115 |
| 5,297,386 A | 3/1994 | Kervistin | |
| 5,685,158 A | 11/1997 | Lenahan et al. | |
| 6,802,691 B2 | 10/2004 | Chlus | |
| 7,559,745 B2 | 7/2009 | Falk et al. | |
| 7,775,764 B2 * | 8/2010 | Snowsill | F01D 5/082 415/115 |
| 7,824,151 B2 | 11/2010 | Schwarz et al. | |
| 8,011,883 B2 | 9/2011 | Schwarz et al. | |
| 9,670,780 B2 | 6/2017 | Baxley | |
| 9,890,645 B2 * | 2/2018 | McCaffrey | F01D 5/082 |
| 2003/0101730 A1 | 6/2003 | Hein et al. | |
| 2006/0245917 A1 | 11/2006 | Burkhardt | |
| 2006/0269398 A1 | 11/2006 | Marini et al. | |
| 2009/0000271 A1 | 1/2009 | Kupratis | |
| 2010/0196143 A1 | 8/2010 | Walker | |
| 2011/0027091 A1 | 2/2011 | Clemen | |
| 2012/0003091 A1 | 1/2012 | Segovia | |
| 2012/0114479 A1 * | 5/2012 | Staubach | F02C 3/107 415/220 |
| 2013/0195660 A1 | 8/2013 | Baxley et al. | |
| 2016/0215792 A1 * | 7/2016 | Hiester | F04D 25/045 |
| 2018/0094528 A1 * | 4/2018 | McCaffrey | F04D 29/321 |

OTHER PUBLICATIONS

Search Report and Written Opinion from corresponding PCT/US14/54915.
International Preliminary Report on Patentability for International Application No. PCT/US2014/054915 dated Apr. 14, 2016.

* cited by examiner

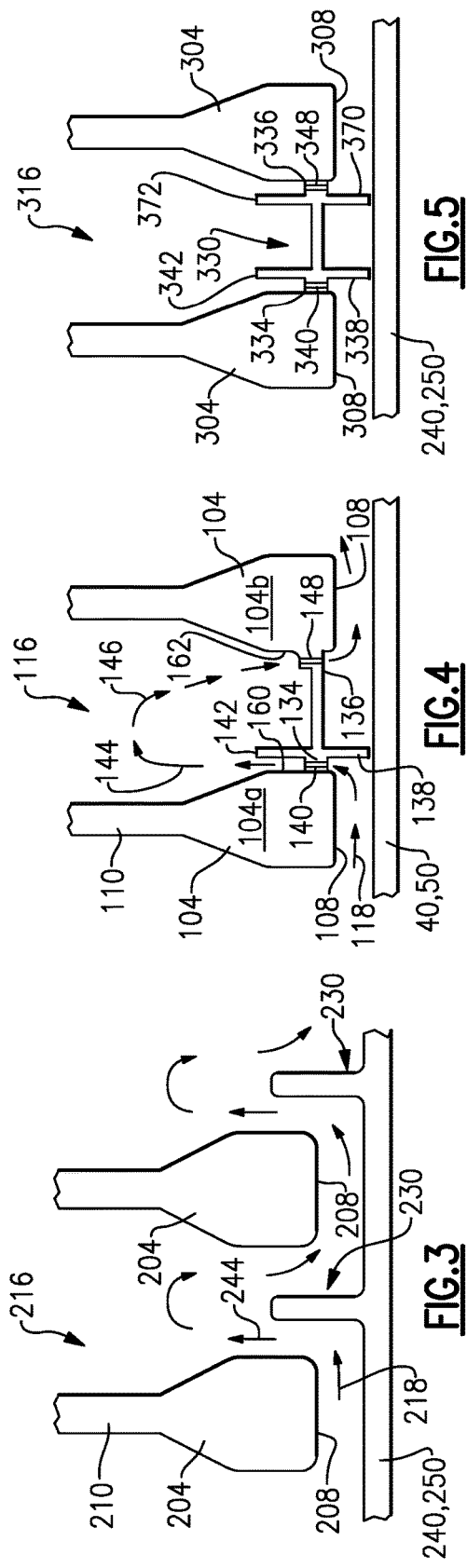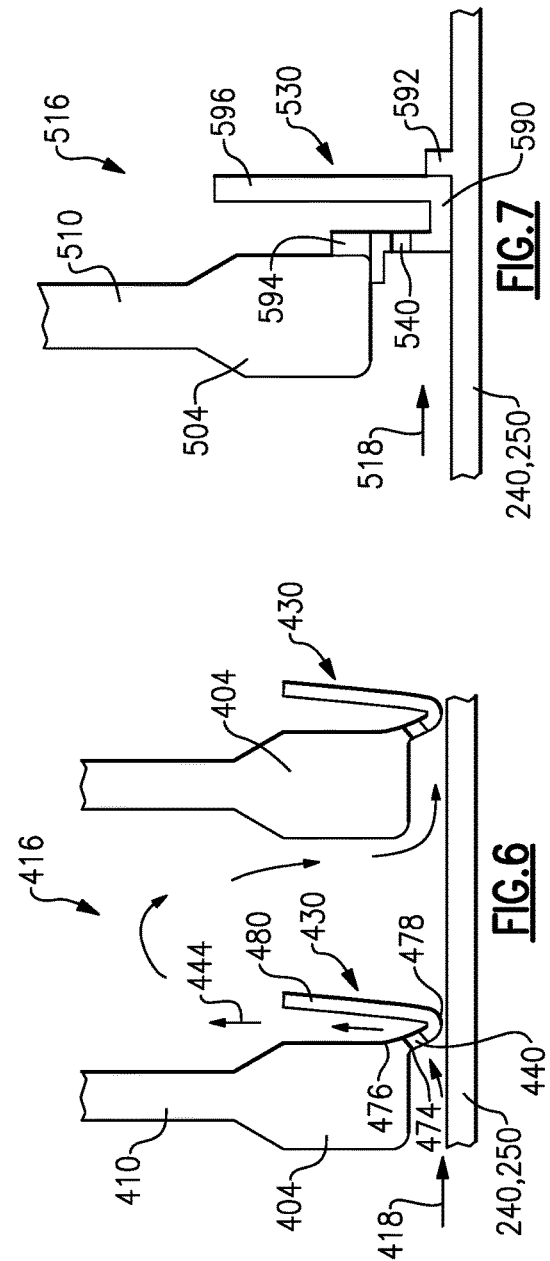

GAS TURBINE ENGINE WITH COMPRESSOR DISK DEFLECTORS

CROSS-REFERENCE TO RELATED APPLICATION

This application claims priority to U.S. Provisional Application No. 61/885,547, filed Oct. 2, 2014.

BACKGROUND

This application relates to a compressor that uses deflectors between compressor bores to reduce thermal gradients in an associated disk.

Gas turbine engines are known and, typically, include a fan delivering air into a compressor section. The air is compressed and then delivered into a combustor section where it is mixed with fuel and ignited. Products of this combustion pass downstream over turbine rotors driving them to rotate.

Compressors have a disk that includes a hub that supports a plurality of circumferentially spaced blades. The hub defines an inner bore diameter for the disk and a web extends from the hub radially outwardly to a platform that supports the blades.

Compressor rotors require secondary flow air for thermal conditioning. This conditioning minimizes thermal gradients, which can increase stress and adversely affect life. Also, as known, thermal gradients influence tip clearance behavior for the blades.

Current configurations do not efficiently condition the disk bore and web regions. As such, the compressor requires significant amount of chargeable flow. Further, the lack of efficient conditioning necessitates the use of heavier disks to compensate for the increased stress.

SUMMARY

In a featured embodiment, a compressor section for use in a gas turbine engine has a plurality of compressor stages, each stage including a disk having an inner periphery defining a bore that faces a shaft, A flow path flows in a generally axial direction between the shaft and the bores of each disk. At least one deflector positioned between a pair of adjacent bores to direct the air flow radially outwardly into a cavity formed between an associated pair of adjacent disks.

In another embodiment according to the previous embodiment, at least one deflector comprises a main body extending between the pair of adjacent disks. The main body includes a forward end that is positioned adjacent a forward disk of the pair of adjacent disks and a rearward end that is adjacent an aft disk of the pair of adjacent disks.

In another embodiment according to any of the previous embodiments, a first deflector portion extends outwardly from the main body to block a portion of the flow path.

In another embodiment according to any of the previous embodiments, a second deflector portion extends outwardly from the main body to direct blocked flow into the cavity.

In another embodiment according to any of the previous embodiments, the first deflector portion extends radially inwardly toward the shaft and the second deflector portion extends radially outwardly away from the shaft.

In another embodiment according to any of the previous embodiments, at least one inlet port is formed within the main body upstream of the first and second deflector portions to direct the blocked flow into the cavity, and includes at least one outlet port formed within the main body downstream of the first and second deflector portions to return flow to the flow path.

In another embodiment according to any of the previous embodiments, at least one inlet port is formed within the main body adjacent the forward disk to direct the blocked flow into the cavity, and includes at least one outlet port formed within the main body adjacent the aft disk to return flow to the flow path.

In another embodiment according to any of the previous embodiments, the main body is attached to at least one of the forward and aft disks.

In another embodiment according to any of the previous embodiments, the main body is attached to the shaft.

In another embodiment according to any of the previous embodiments, the deflector is positioned between bores of an upstream disk and an adjacent downstream disk. The deflector is axially closer to the upstream disk than the downstream disk. The deflector includes a portion that extends in a radially outward direction such that axial air flow is redirected in a radial direction along a web of the upstream disk.

In another embodiment according to any of the previous embodiments, the deflector is integrally formed with the shaft.

In another embodiment according to any of the previous embodiments, the deflector is integrally formed with the upstream disk.

In another embodiment according to any of the previous embodiments, the deflector comprises a plug that is attached to the upstream and downstream disks.

In another embodiment according to any of the previous embodiments, the deflector comprises a shaft sleeve that is fixed for rotation with the shaft.

In another featured embodiment, a gas turbine engine has at least one shaft defining an engine axis of rotation. A compressor section and a turbine section connect to each other by the at least one shaft. The compressor section comprises a plurality of compressor stages, each stage including a disk having an inner periphery defining a bore. A flow path flow in a generally axial direction along the bores of each disk. At least one deflector is positioned between a pair of adjacent bores to direct the air flow radially outwardly into a cavity formed between an associated pair of adjacent disks.

In another embodiment according to the previous embodiment, the compressor section comprises a high pressure compressor section and the turbine comprises a high pressure turbine section. The at least one shaft comprises at least a first shaft connecting the high pressure turbine and high pressure compressor sections and a second shaft connecting a low pressure turbine section to a low pressure compressor section. The first shaft rotates at a faster speed than the second shaft.

In another embodiment according to any of the previous embodiments, a fan section is upstream of the compressor section and driven by one of the first and second shafts.

In another embodiment according to any of the previous embodiments, a gear drive connects the fan section to one of the first and second shafts.

In another embodiment according to any of the previous embodiments, the deflector is positioned between bores of an upstream disk and an adjacent downstream disk, the deflector being axially closer to the upstream disk than the downstream disk, and wherein the deflector includes a portion that extends in a radially outward direction such that axial air flow is redirected in a radial direction along a web of the upstream disk.

In another embodiment according to any of the previous embodiments, the deflector comprises one of a plug attached to the upstream and downstream disks or a shaft sleeve attached for rotation with the shaft.

In another embodiment according to any of the previous embodiments, the deflector is integrally formed with the shaft or integrally formed with at least one of the upstream and downstream disks.

These and other features may be best understood from the following drawings and specification.

BRIEF DESCRIPTION OF THE DRAWINGS

FIG. 3 shows a compressor section of a gas turbine engine including another exemplary embodiment of a deflector.

FIG. 4 shows a compressor section of a gas turbine engine including another exemplary embodiment of a deflector.

FIG. 5 shows a compressor section of a gas turbine engine including another exemplary embodiment of a deflector.

FIG. 6 shows a compressor section of a gas turbine engine including another exemplary embodiment of a deflector.

FIG. 7 shows a compressor section of a gas turbine engine including another exemplary embodiment of a deflector.

DETAILED DESCRIPTION

Figure 1:
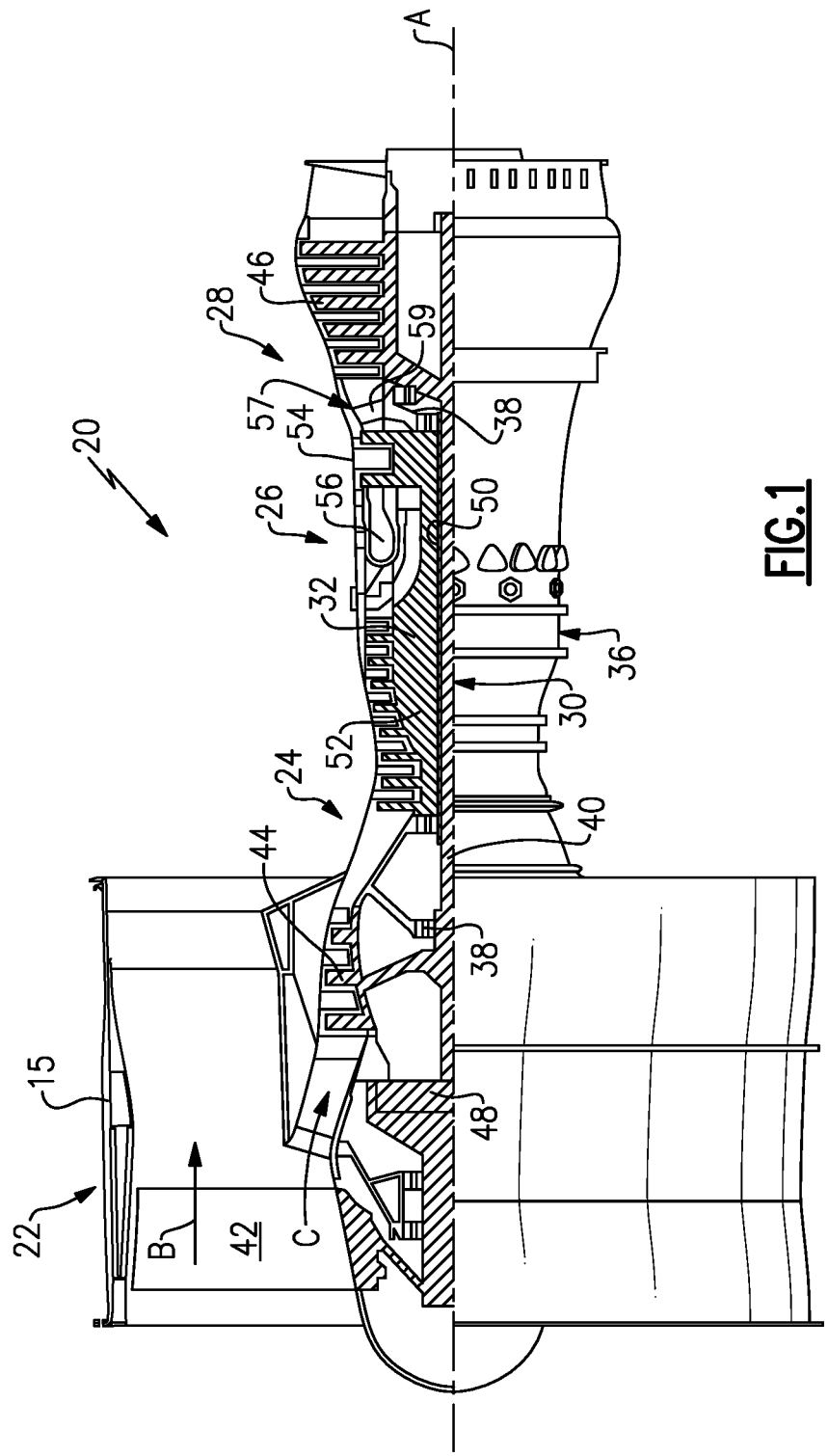
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

Figure 2:
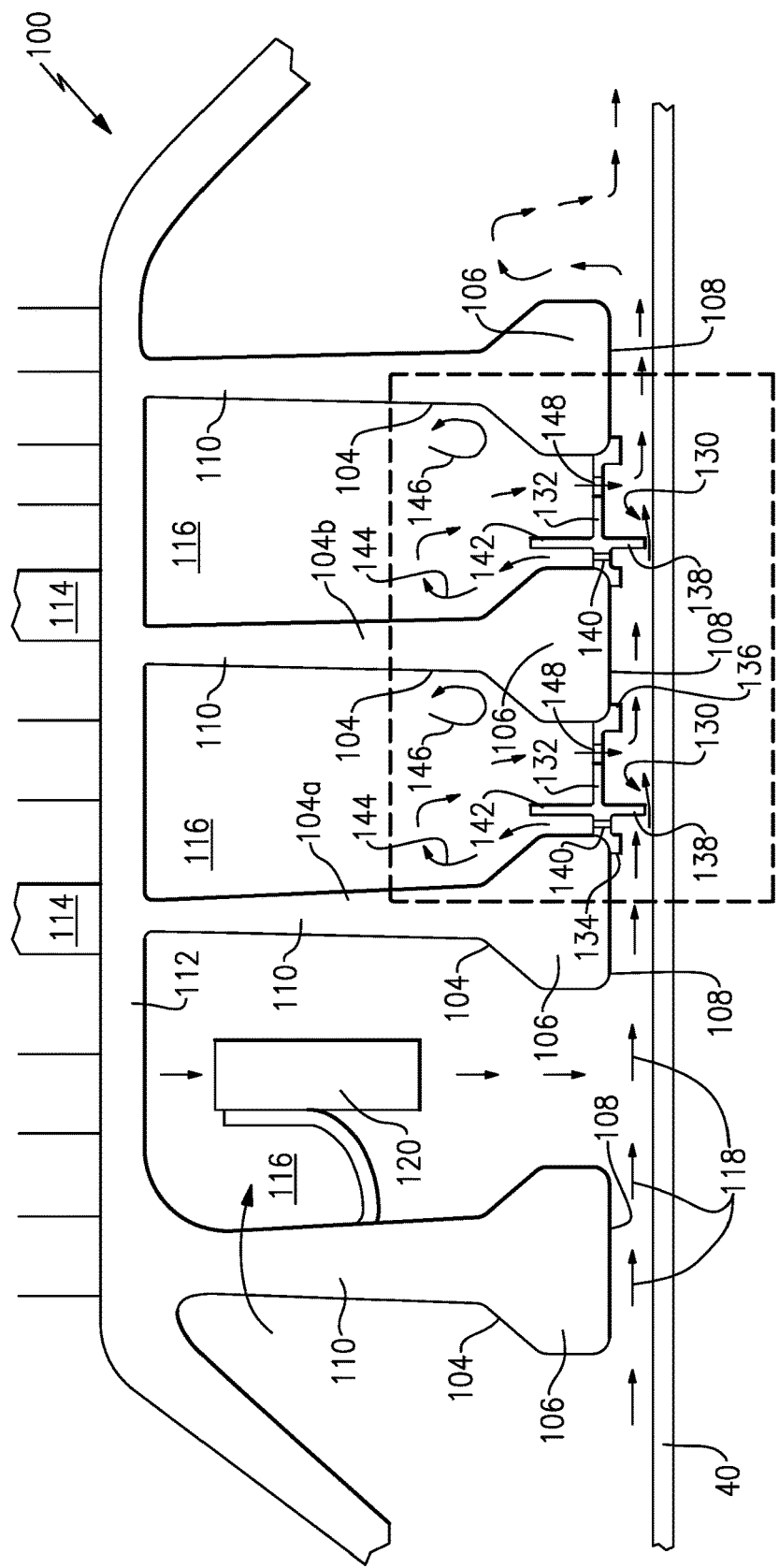
FIG. 2 shows a compressor section of a gas turbine engine including one exemplary embodiment of a deflector.

In the example shown in FIG. 2, a compressor rotor 100 for one or more compressor stages for the high pressure compressor 52 is mounted for rotation with the outer shaft 50 (high speed shaft) as discussed above. A plurality of disks 104 are connected to the rotor 100. Each disk 104 includes an inner hub 106 that has an inner periphery defining a disk bore 108 that faces the inner shaft 40 (low speed shaft). Webs 110 extend from the hubs 106 to upper supports 112 for the blades 114. Between each pair of adjacent disks 104 are cavities 116. An axial flow path 118 is formed between the bores 108 and the shaft 40.

In one example, an anti-vortex tube 120 is mounted to one of the webs 110 of the disks 104. The anti-vortex tube 120 reduces pressure loss.

A deflector 130 is positioned between a pair of adjacent bores 108 to direct the air flow radially outwardly into the associated cavity 116 formed between an associated pair of adjacent disks 104. Deflectors 130 can be positioned between each pair of adjacent bores 108, or only between certain adjacent bores 108 as needed.

The deflector 130 comprises a main body 132 that includes a forward end 134 extending toward a forward disk 104a of the pair of adjacent disks 104 and an aft end 136 extending toward an aft disk 104b of the pair of adjacent disks 104. In the example shown, the forward end 134 is attached to the forward disk 104a and the aft end 136 is attached to the aft disk 104b. Optionally, the deflector 130 could be integrally formed with one or more of the disks 104.

A first deflector portion 138 extends radially inwardly from the main body 132 toward the shaft 40 to block the flow path 118. In this configuration, the first deflector portion 138 is spaced from the shaft 40 by a small gap. The first deflector portion 138 forces the flow to go radially outwardly and into at least one inlet port 140 that is formed within the main body 132 upstream of the first deflector portion 138.

A second deflector portion 142 extends radially outwardly from the main body 132 and into the associated cavity 116. In one example, the first and second deflector portions 138, 142 are in radial alignment with each other. Further, the first and second deflector portions 138, 142 may be positioned axially closer to the upstream disk bore 108 than the downstream disk bore 108 to further enhance flow.

Flow exiting the one or more inlet ports 140 is forced by the second deflector portion 142 to flow in a radially outward direction along the web 110, as indicated by arrow 144. The flow over the second deflector portion 142 creates a recirculating flow pattern 146 that promotes rotor conditioning/heat transfer between the flow and disks. The first and second deflector portions 138, 142 are positioned axially closer to the upstream disk bore 108 to further promote recirculating flow. The flow is then returned to the flow path 118 via one or more outlet ports 148 that are formed in the main body 132 downstream of the second deflector portion 142. The flow flows along the flow path 118 until the flow reaches the next downstream first deflector portion 138, where the flow is then deflected into the next downstream cavity 116 in the same manner as described above.

The first deflector portion 138 of the deflector 130 extends radially inboard to seal between the high speed and low speed shaft. The second deflector 142 portion extends radially outboard to deflect and guide the conditioning flow. The second deflector portion 142 is positioned close enough axially relative to the disk bore 108 to ensure the flow becoming entrained in a disk pumping boundary layer.

Optionally, instead of being attached to the disks 104, the deflector could be attached to, or formed as part of, the shaft. FIG. 3 shows an example where a high 250 or low 240 rotor shaft includes integrally formed deflectors 230. The deflectors 230 are positioned between adjacent bores 208 of adjacent disks 204. The deflectors 230 extend radially outwardly from the shaft 240, 250 in a direction toward a cavity 216 formed between the disks 204. In the example shown, the deflectors are positioned closer to the upstream disk 204 than the downstream disk 204 such that the flow can be more easily directed along the upstream web 210.

An axial flow path 218 is formed between the bores 208 and the shaft 240, 250. The deflector 230 forces the flow radially outward into the cavity 216 and along the web 210 as indicated by arrow 244. The walls of the cavity 216 then direct the flow to return to the axial flow path 218. The flow flows along the axial flow path 218 until the flow reaches the next downstream deflector 230, where the flow is then deflected into the next downstream cavity 216 in the same manner as described above.

FIG. 4 shows a single prong plug design similar to FIG. 2. In this example, the forward end 134 is secured to rear face 160 of the upstream disk 104a and the aft end 136 is secured to a forward face 162 of the downstream disk 104b. The first deflector portion 138 forces the axial flow 118 into the inlet port 140 and the second deflector portion 142 directs the flow in a radially outward direction along the web 110, as indicated by arrow 144. The flow over the second deflector portion 142 creates a recirculating flow pattern 146 that promotes cooling. The flow is then returned to the flow path 118 via the outlet port 148.

FIG. 5 shows a dual prong plug design between adjacent disks 304. A forward end 334 is secured to the upstream disk and an aft end 336 is secured to the downstream disk. In this configuration, a deflector 330 includes first 338 and second 342 deflector portions that are similarly configured to those of the single prong design. Further, the deflector 330 includes third 370 and fourth 372 deflector portions. The fourth deflector portion 372 forces the flow between the small axial gap formed between the fourth deflector portion 372 and the adjacent disk 304. Doing so increases heat transfer between said flow and the adjacent disk 304. The deflector 330 includes an inlet port 340 to direct flow into the cavity 316 and an outlet port 348 to direct flow along the next bore 308.

FIG. 6 shows a bore trail design where a deflector 430 is integrally formed on a disk 404. In one example, the deflector 430 has a J-shape with a first portion 474 that curves radially inwardly from an aft edge 476 of the disk 404 to form a lower apex 478 that is spaced from the low 240 or high 250 shaft by a small gap. From the apex 478 a linear portion 480 extends in a radially outward direction. An inlet port 440 is formed in the curved portion 474 upstream of the apex 478 to direct axial flow 418 into the cavity 416 between the disks 404. The linear portion 480 directs the flow along the web 410 as indicated at 444 and then the walls of the cavity 416 direct the flow to return to the axial flow path 418.

FIG. 7 shows a deflector 530 that is formed as part of a shaft sleeve 590. The high 250 rotor shaft includes an abutment 592 that seats the sleeve 590. The deflector 530 includes a first portion 594 extends radially outward from the sleeve 590 to attach to a disk 504. An inlet port 540 is formed within the first portion 594. A second portion 596 extends radially outwardly from the sleeve 590 to direct the flow along the web 510 and then the walls of the cavity 516 direct the flow to return to the axial flow path 518.

Testing results have shown that the subject deflectors provide disk bore and web regions with increased heat transfer, which results in faster bore and web thermal responses. Further, rim-to-bore and rim-to-web gradients are also significantly reduced with the use of deflectors.

Thus, the subject deflectors take primarily axial flow and turns the flow radially outward. The radial flow enhances rotor thermal conditioning by promoting flow recirculation within the cavities. The conditioning flow created by the deflector results in higher relative velocities and promotes recirculation in the cavity, which efficiently conditions the disk bores and the webs. Higher relative velocities also provide enhanced heat transfer. The deflectors also provide a low pressure design configuration with only a very minimal weight penalty.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A compressor section for use in a gas turbine engine comprising:
   a plurality of compressor stages, each stage including a disk having an inner hub with an inner periphery defining a bore that faces a shaft;
   a flow path flowing in an axial direction between the shaft and the bores of the disks;
   at least one deflector positioned between a pair of adjacent bores of the bores to direct the air flow radially outwardly into a cavity formed between an associated pair of adjacent disks of the disks, and wherein the at least one deflector comprises a main body having a forward end that is attached to or integrally formed with the hub of an upstream disk of the associated pair of adjacent disks and at least one portion that extends away from the main body such that axial air flow is redirected in a radial direction along a web of the upstream disk, and wherein the at least one portion is axially closer to the upstream disk than a downstream disk of the associated pair of adjacent disks;
   wherein the at least one portion includes a first deflector portion extending away from the main body to block a portion of the flow path;
   wherein the at least one portion further includes a second deflector portion extending away from the main body to direct blocked flow into the cavity; and
   at least one inlet port formed within the main body upstream of the first and second deflector portions to direct the blocked flow into the cavity, and including at least one outlet port formed within the main body downstream of the first and second deflector portions to return flow to the flow path.

2. The compressor section for use in a gas turbine engine as set forth in claim 1, wherein the first deflector portion extends radially inwardly toward the shaft and wherein the second deflector portion extends radially outwardly away from the shaft.

3. The compressor section for use in a gas turbine engine as set forth in claim 2, wherein the first deflector portion extends into the flow path to redirect flow into the cavity and the second deflector portion extends into the cavity to direct flow along the web of the upstream disk, and wherein the first and second deflector portions are in radial alignment with each other.

4. The compressor section for use in a gas turbine engine as set forth in claim 1, wherein the at least one inlet port is adjacent the upstream disk and the at least one outlet port is adjacent the downstream disk.

5. The compressor section for use in a gas turbine engine as set forth in claim 1, wherein a rearward end of the main body is attached to the downstream disk.

6. The compressor section for use in a gas turbine engine as set forth in claim 1 wherein the at least one deflector is attached to the upstream disk and the downstream disk.

7. The compressor section for use in a gas turbine engine as set forth in claim 1, wherein the inner hub of the upstream disk includes a rear face that faces a forward face of the inner hub of the downstream disk, and wherein the forward end of the main body is attached to at least a portion of the rear face.

8. The compressor section for use in a gas turbine engine as set forth in claim 7, wherein the main body includes a rearward end that is attached to at least a portion of the forward face of the inner hub of the downstream disk.

9. A compressor section for use in a gas turbine engine comprising:
   a plurality of compressor stages, each stage including a disk having an inner hub with an inner periphery defining a bore that faces a shaft;
   a flow path flowing in an axial direction between the shaft and the bores of the disks; and
   at least one deflector positioned between a pair of adjacent bores of the bores to direct the air flow radially outwardly into a cavity formed between an associated pair of adjacent disks of the disks, and wherein the at least one deflector comprises a main body having a forward end that is attached to or integrally formed with the hub of an upstream disk of the associated pair of adjacent disks and at least one portion that extends away from the main body such that axial air flow is redirected in a radial direction along a web of the upstream disk, and wherein the at least one portion is axially closer to the upstream disk than a downstream disk of the associated pair of adjacent disks, and wherein the at least one deflector is integrally formed with the hub of the upstream disk.

10. A compressor section for use in a gas turbine engine comprising:
    a plurality of compressor stages, each stage including a disk having an inner periphery defining a bore that faces a shaft;
    a flow path flowing in an axial direction between the shaft and the bores of the disks; and
    at least one deflector positioned between a pair of adjacent bores of the bores to direct the air flow radially outwardly into a cavity formed between an associated pair of adjacent disks, and wherein the at least one deflector is positioned between bores of an upstream disk of the disks and an adjacent downstream disk of the disks, the at least one deflector being axially closer to the upstream disk than the downstream disk, and wherein the at least one deflector includes a portion that extends in a radially outward direction such that axial air flow is redirected in a radial direction along a web of the upstream disk, and wherein the at least one deflector is integrally formed with the upstream disk.

11. A gas turbine engine comprising:
    at least one shaft defining an engine axis of rotation;
    a compressor section and a turbine section connected to each other by the at least one shaft, wherein the compressor section comprises a plurality of compressor stages, each stage including a disk having an inner hub with an inner periphery defining a bore;
    a flow path flowing in an axial direction along the bores of the disks;

at least one deflector positioned between a pair of adjacent bores of the bores to direct the air flow radially outwardly into a cavity formed between an associated pair of adjacent disks of the disks, and wherein the at least one deflector comprises a main body having a forward end that is attached to or integrally formed with the hub of an upstream disk of the associated pair of adjacent disks and at least one portion that extends away from the main body such that axial air flow is redirected in a radial direction along a web of the upstream disk, and wherein the at least one portion is axially closer to the upstream disk than a downstream disk of the associated pair of adjacent disks;

wherein the inner hub of the upstream disk includes a rear face that faces a forward face of the inner hub of the downstream disk, and wherein the forward end of the main body is attached to at least a portion of the rear face; and wherein the main body extends to a rearward end that is free from attachment to the downstream disk.

12. The gas turbine engine as set forth in claim 11, wherein the compressor section comprises a high pressure compressor section and the turbine section comprises a high pressure turbine section, and wherein the at least one shaft comprises at least a first shaft connecting the high pressure turbine and high pressure compressor sections and a second shaft connecting a low pressure turbine section to a low pressure compressor section, wherein the first shaft rotates at a faster speed than the second shaft.

13. The gas turbine engine as set forth in claim 12, including a fan section upstream of the compressor section and driven by one of the first and second shafts.

14. The gas turbine engine as set forth in claim 13, including a gear drive connecting the fan section to one of the first and second shafts.

15. The gas turbine engine as set forth in claim 11, wherein the at least one portion extends in a radially outward direction.

16. The gas turbine engine as set forth in claim 15, wherein the at least one deflector includes a shaft sleeve attached for rotation with the at least one shaft.

17. The gas turbine engine as set forth in claim 11, wherein the at least one portion includes a first deflector portion extending radially inwardly from the main body and into the flow path to redirect flow into the cavity and a second deflector portion extending radially outwardly from the main body and into the cavity to direct flow along the web of the upstream disk.

18. A gas turbine engine comprising:
at least one shaft defining an engine axis of rotation;
a compressor section and a turbine section connected to each other by the at least one shaft, wherein the compressor section comprises a plurality of compressor stages, each stage including a disk having an inner hub with an inner periphery defining a bore;
a flow path flowing in an axial direction along the bores of the disks; and
at least one deflector positioned between a pair of adjacent bores of the bores to direct the air flow radially outwardly into a cavity formed between an associated pair of adjacent disks of the disks, and wherein the at least one deflector comprises a main body having a forward end that is integrally formed with the hub of an upstream disk of the associated pair of adjacent disks and at least one portion that extends away from the main body such that axial air flow is redirected in a radial direction along a web of the upstream disk, and wherein the at least one portion is axially closer to the upstream disk than a downstream disk of the associated pair of adjacent disks;

wherein the at least one portion extends in a radially outward direction.

19. A compressor section for use in a gas turbine engine comprising:
a plurality of compressor stages, each stage including a disk having an inner hub with an inner periphery defining a bore that faces a shaft;
a flow path flowing in an axial direction between the shaft and the bores of the disks;
at least one deflector positioned between a pair of adjacent bores of the bores to direct the air flow radially outwardly into a cavity formed between an associated pair of adjacent disks of the disks, and wherein the at least one deflector comprises a main body having a forward end that is attached to or integrally formed with the hub of an upstream disk of the associated pair of adjacent disks and at least one portion that extends away from the main body such that axial air flow is redirected in a radial direction along a web of the upstream disk, and wherein the at least one portion is axially closer to the upstream disk than a downstream disk of the associated pair of adjacent disks;

wherein the inner hub of the upstream disk includes a rear face that faces a forward face of the inner hub of the downstream disk, and wherein the forward end of the main body is attached to at least a portion of the rear face; and wherein the main body extends to a rearward end that is free from attachment to the downstream disk.

* * * * *